United States Patent
Muiter

(10) Patent No.: US 10,246,028 B1
(45) Date of Patent: Apr. 2, 2019

(54) CUP HOLDER WITH INTEGRATED, DEPLOYABLE PURSE AND PARCEL HOOK

(71) Applicant: FORD GLOBAL TECHNOLOGIES, LLC, Dearborn, MI (US)

(72) Inventor: James Hadley Muiter, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/705,573

(22) Filed: Sep. 15, 2017

(51) Int. Cl.
*B60N 3/10* (2006.01)
*B60R 11/00* (2006.01)

(52) U.S. Cl.
CPC .............. *B60R 11/00* (2013.01); *B60N 3/101* (2013.01); *B60R 2011/0007* (2013.01); *B60R 2011/0085* (2013.01)

(58) Field of Classification Search
CPC ........... B60R 11/00; B60R 3/101; B60R 3/10; B60R 3/103; B60R 2011/007; B60R 2011/0085; B60R 11/10; B60R 11/103; B60R 2011/0007; A47G 23/0208; A47G 23/0225; A47G 23/02; A47G 23/0216; A47G 23/0266; A47G 2200/143; B60N 3/101; B60N 3/02
USPC ...... 248/311.2, 312.1, 310, 309.1, 102, 103; 211/85.29; 206/139, 427, 429; 224/556, 224/148.7, 566, 926; 220/23.83, 475, 220/574, 737; 108/152
See application file for complete search history.

(56) References Cited

U.S. PATENT DOCUMENTS

| 5,881,935 A * | 3/1999 | Ono ........................ B60N 3/102 220/531 |
| 5,897,089 A * | 4/1999 | Lancaster .............. B60N 3/102 248/311.2 |
| 8,397,963 B2 | 3/2013 | Singh |
| 2010/0308616 A1 | 12/2010 | Singh et al. |
| 2016/0368428 A1 | 12/2016 | Stiff |

FOREIGN PATENT DOCUMENTS

| DE | 202007016297 U1 | 3/2008 |
| DE | 102011112438 A1 | 3/2013 |
| JP | 2002240635 A | 8/2002 |
| KR | 1171668 B1 | 6/2012 |
| KR | 1381067 B1 | 4/2014 |

OTHER PUBLICATIONS

English Machine Translation of DE102011112438A1.
English Machine Translation of DE202007016297U1U1.
English Machine Translation of JP2002240635A.
English Machine Translation of KR1171668B1.
English Machine Translation of KR1381067B1.

* cited by examiner

*Primary Examiner* — Nkeisha Smith
(74) *Attorney, Agent, or Firm* — Vichit Chea; King & Schikli, PLLC

(57) ABSTRACT

An apparatus is provided capable of holding one or more drink cups and a purse, pocketbook or like parcel. The apparatus includes a body having a first cup well and a second cup well. A hook is carried on the body. The hook is displaceable between a home position, wherein the hook is aesthetically integrated into the body, and a deployed position wherein the hook is available for holding the purse, parcel or pocketbook.

6 Claims, 5 Drawing Sheets

CUP HOLDER WITH INTEGRATED, DEPLOYABLE PURSE AND PARCEL HOOK

TECHNICAL FIELD

This document relates generally to the motor vehicle equipment field and, more particularly, to an apparatus comprising a cup holder with an integral, deployable hook for holding a purse or parcel.

BACKGROUND

Most motor vehicles today do not include a purse, pocket book or parcel hook to hold purses, pocketbooks and parcels. This is due to a number of different factors. Significantly, there is limited space for such a hook within easy reach of the driver of a motor vehicle on the instrument panel, center console, center stack and surrounding trim panels. Further, interior styling features make it difficult to incorporate such a hook while maintaining aesthetic appeal. More specifically, any extraneous cutlines for a hook could be perceived as creating degraded craftsmanship.

This document relates to an apparatus comprising a combined cup holder and deployable hook allowing one to quickly and easily store a purse, handbag or other like parcel within easy reach of the driver while providing minimal disruption to other vehicle occupants and placing minimal or no limitation on existing vehicle styling. Advantageously, the hook creates minimal or no extraneous cutlines that would otherwise degrade the aesthetic appearance of the motor vehicle. As such, the combined cup holder and hook apparatus represents a significant advance in the art.

SUMMARY

In accordance with the purposes and benefits described herein, an apparatus is provided comprising a body including a first cup well and a hook carried on the body. The hook is displaceable between a home position where it is fully integrated into the apparatus in an aesthetically pleasing manner and a deployed position where the hook is available to receive and hold a purse, pocketbook or like parcel such as a grocery sack or shopping bag. The body may include a second cup well. Further, the body may include a partition between the first cup well and the second cup well. The hook may be carried on that partition.

The apparatus may further include a hinge connecting the hook to the body. In addition, the apparatus may further include a latch feature releasably securing the hook in the home position. In one of many possible embodiments, that latch feature may comprise a push-push latch. Such a latch feature may include a striker carried on the hook and a striker receiver carried on the partition. That striker receiver may include a spring loaded piston to aid in deploying the hook when the latch feature is released.

Further describing the invention, the hinge may be carried on a post held in the body. That post may be displaceable between a stowed position and a raised position. In addition the apparatus may further include a biasing element for biasing the post toward the stowed position.

The apparatus may further include a rail adjacent the body. The rail may rise above the partition. The hook may extend across the rail when in the deployed position The apparatus may further include a guard feature adjacent the striker receiver. The guard feature protects the striker receiver from impact damage when the hook is deployed.

In one of the many possible embodiments, the hinge may be a locking leaf hinge.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof. In the drawing figures:

FIG. 1 illustrates the hook in the home position.

Reference will now be made in detail to the present preferred embodiments of the apparatus, examples of which are illustrated in the accompanying drawing figures.

DETAILED DESCRIPTION

Figure 1:
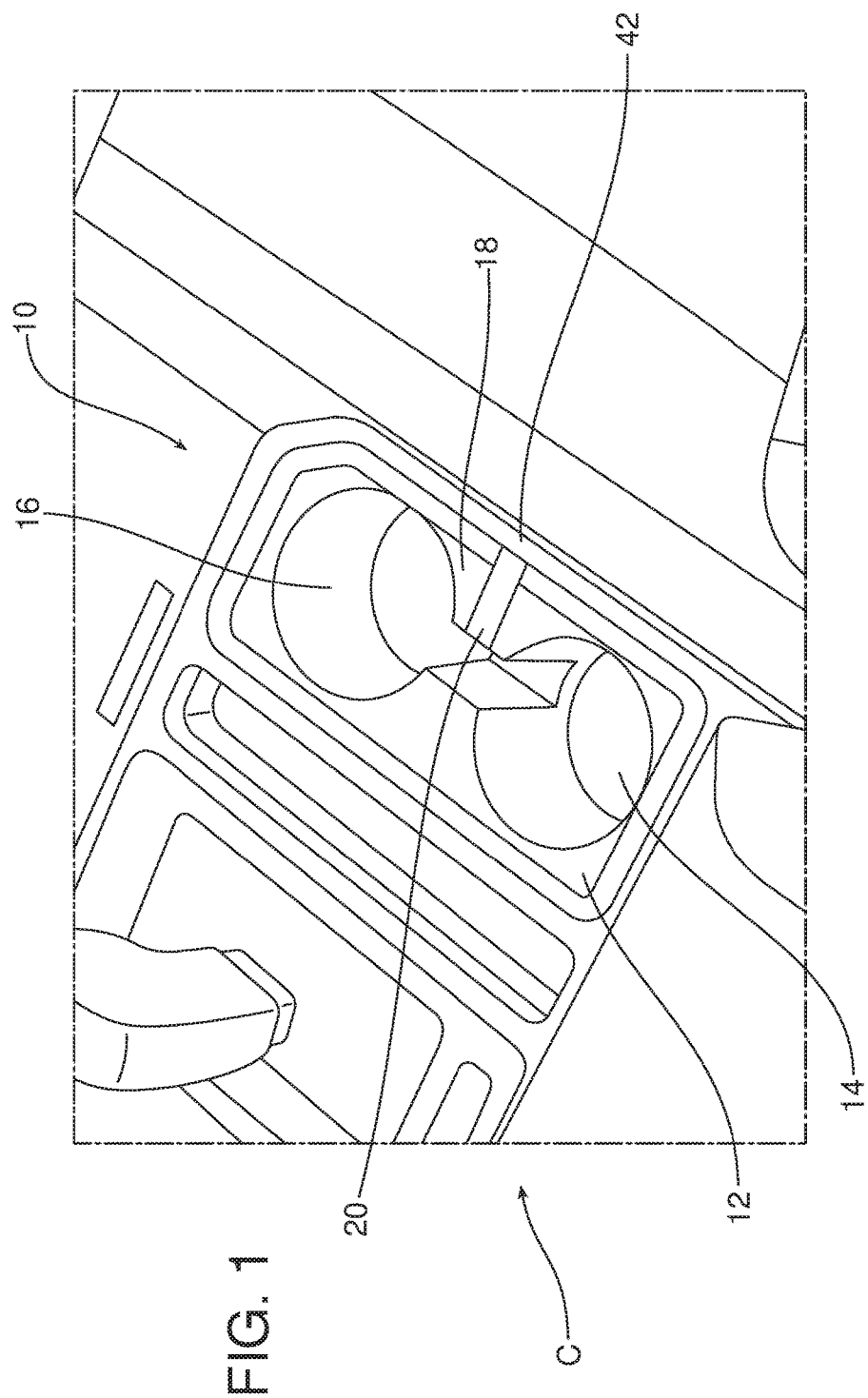
FIG. 1 is a detailed perspective view of the interior of a motor vehicle and, more particularly, the center console incorporating a first embodiment of the current apparatus for holding one or more cups and including a deployable hook for holding a purse, pocketbook or like parcel.
Figure 2:
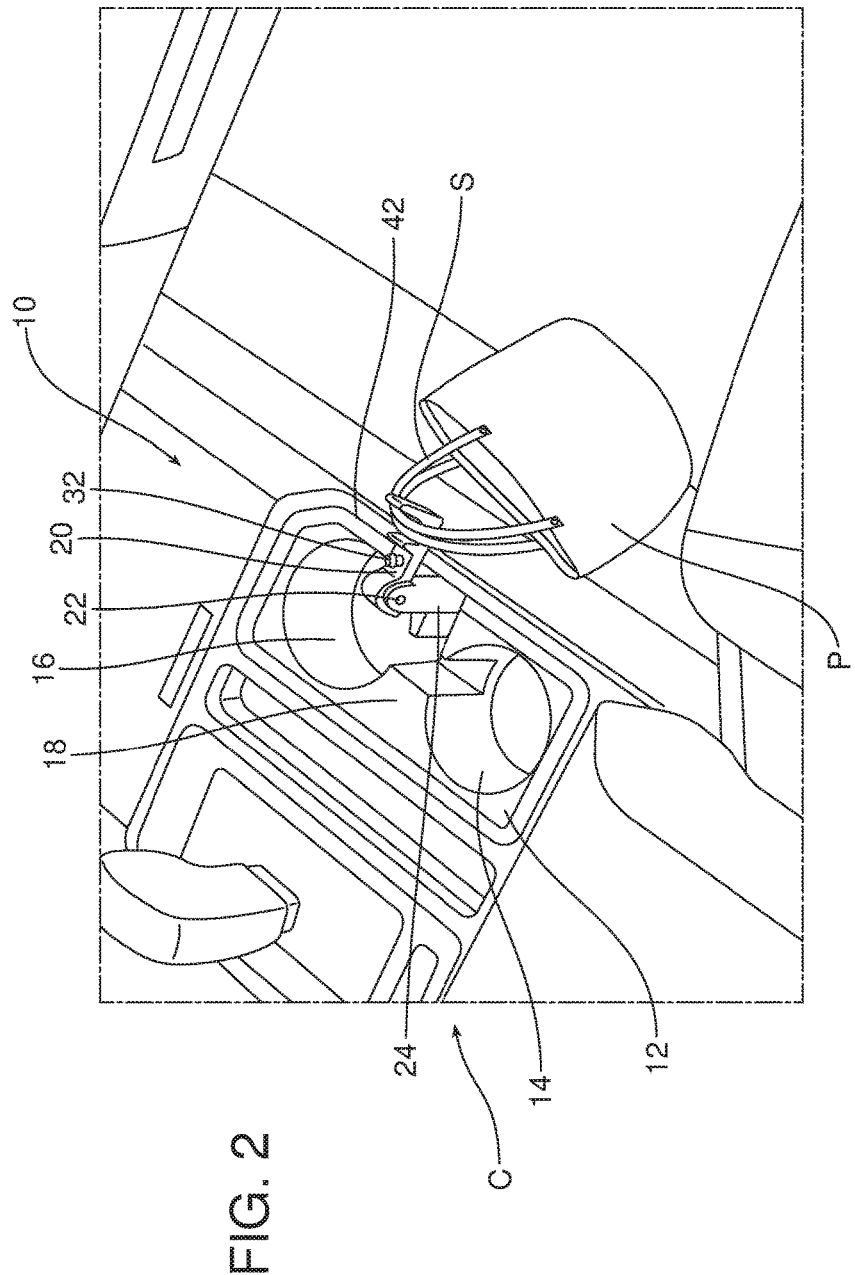
FIG. 2 is a view similar to FIG. 1 but illustrating the hook in the deployed position, holding a purse by the strap of the purse.

Reference is now made to FIGS. 1 and 2 which illustrates a center console C including the apparatus 10. The apparatus 10 includes a body 12 made from plastic, composite or other appropriate material. In the illustrated embodiment, the body 12 includes a first cup well 14, a second cup well 16 and a partition 18 between the first cup well and the second cup well.

A hook 20 is carried on the body 12. In the illustrated embodiment the hook 20 is carried on the partition 18.

Figure 3A:
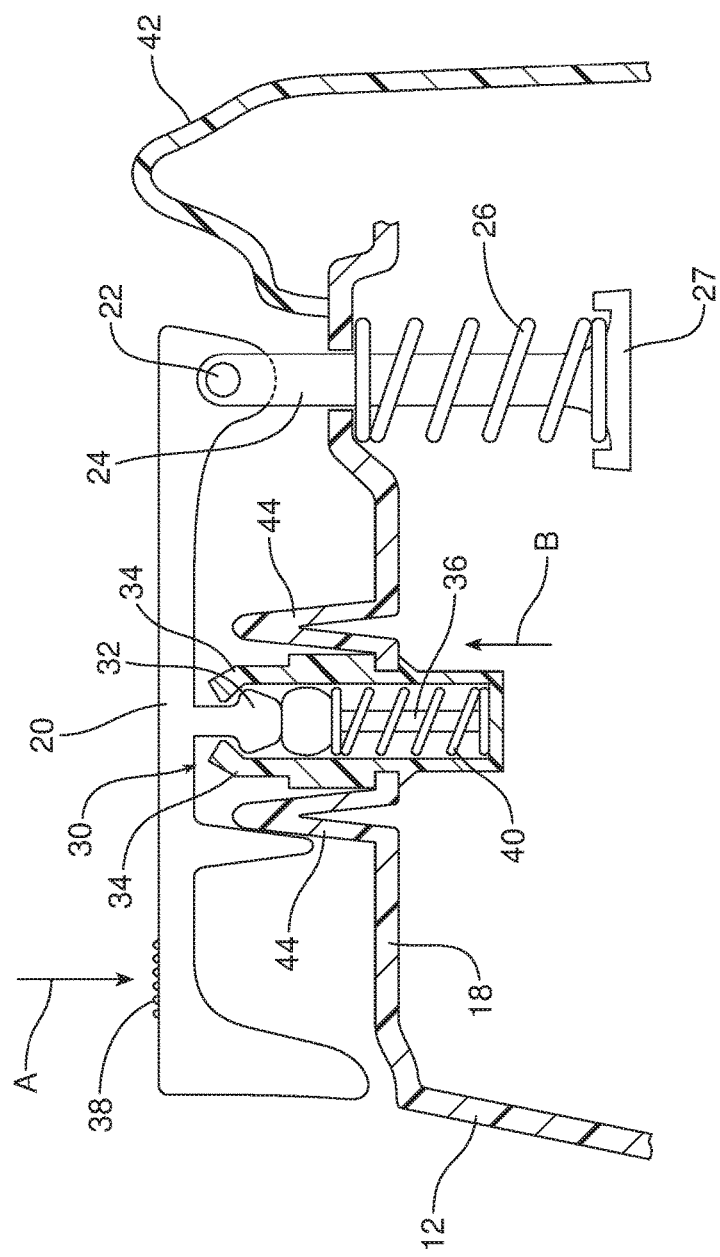
FIG. 3a is a detailed schematic sectional view of a second embodiment of the apparatus showing the hook in the home position.
Figure 3B:
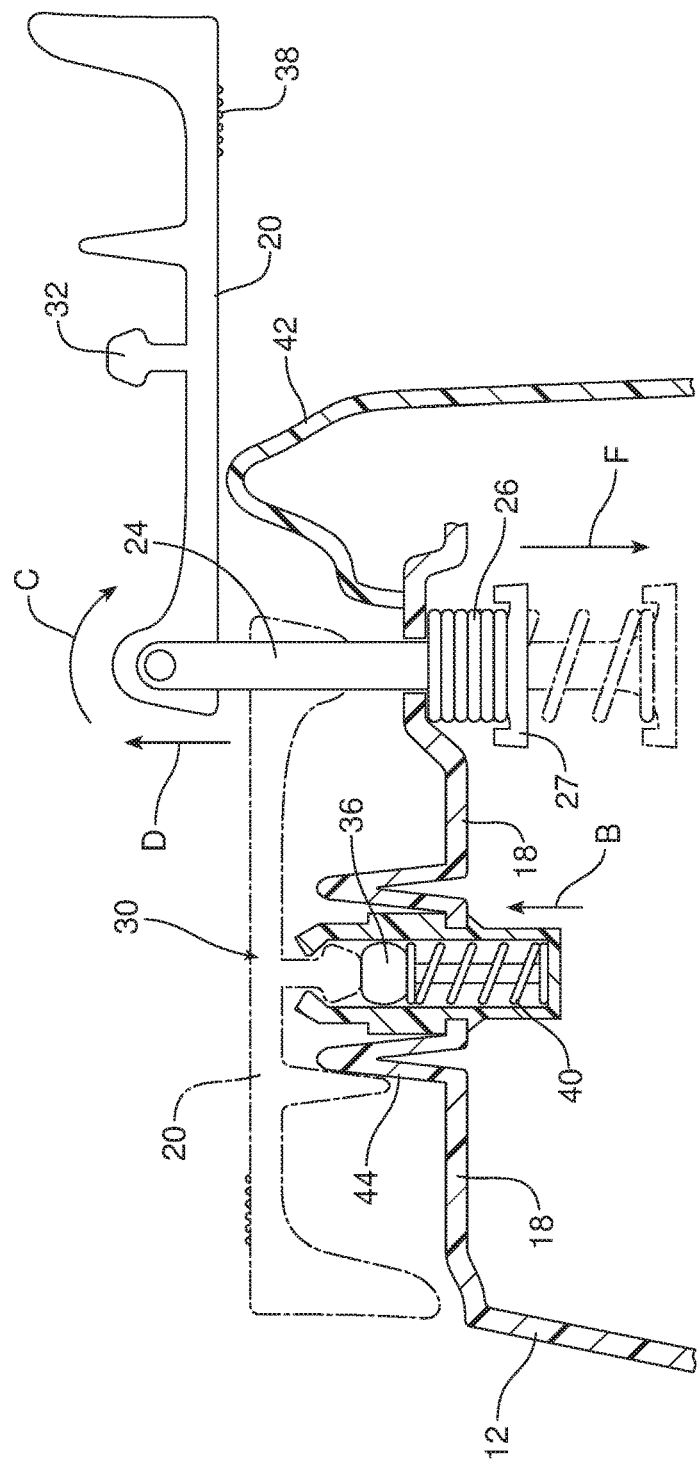
FIG. 3b is a detailed schematic sectional view of the second embodiment showing the hook being displaced from the home position to the deployed position.
Figure 3C:
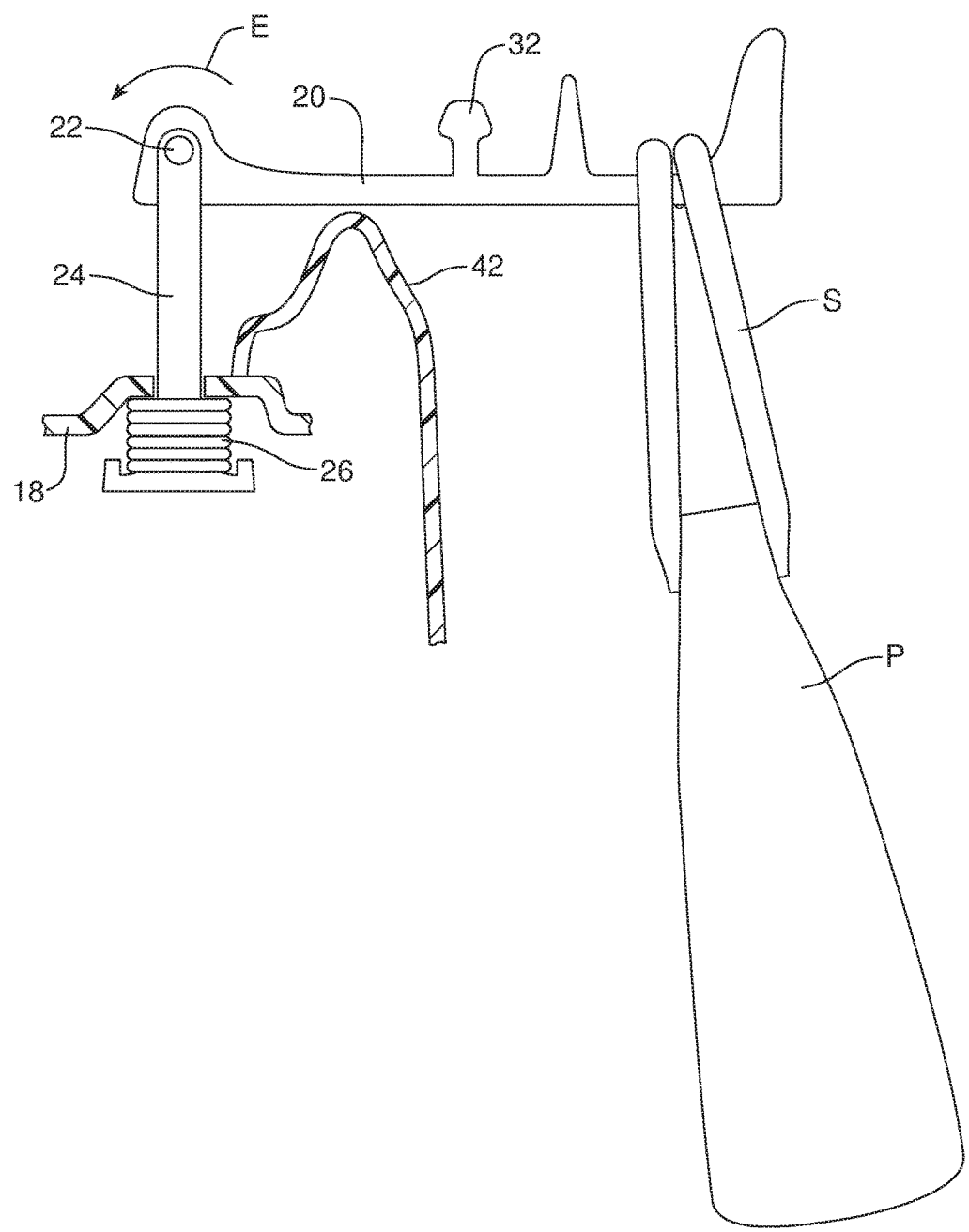
FIG. 3c is a view similar to FIG. 3a showing the hook in the fully deployed position holding a purse by the strap of the purse.

As will become apparent from the following description, the hook 20 is displaceable between a home position wherein the hook is fully incorporated into the partition 18 (note particularly FIGS. 1 and 3a) and a deployed position wherein the hook projects from the partition and is capable of receiving and holding a strap S of a purse, pocketbook or parcel P (see FIGS. 2 and 3c).

As should be best illustrated from reviewing FIGS. 3a-3c, the apparatus 10 further includes a hinge 22 for connecting the hook 20 to the body 12. In one possible embodiment that hinge is a locking leaf hinge.

More specifically, in the illustrated embodiment the hinge 22 is carried on post 24 held in the body 12 and displaceable between a stowed position, retracted within the partition 18

(note FIG. 3a and phantom line position in FIG. 3b) and a raised position projecting from the partition (note full line position in FIG. 3b and FIG. 3c). A biasing element 26, in the form of a compression spring, biases the post 24 toward the stowed position. That compression spring may be concentrically received around the post 24 and extend between the partition 18 and the base 27 of the post as illustrated in the drawing FIGS. 3a-3c. The apparatus 10 also includes a latch feature generally designated by reference numeral 30. In the illustrated embodiment, the latch feature 30 comprises a push-push latch. Thus, as illustrated in FIG. 3a, the latch feature includes a striker 32 carried on the hook 20 and a striker receiver 34 carried on the partition 18. A spring loaded piston 36 is provided in a bore 33 of the striker receiver 34.

When the hook 20 is in the home position, the striker 32 on the hook is received and held in the striker receiver 34 and the post 24 is in the stowed position (see FIG. 3a). When one wishes to deploy the hook 20, one presses downwardly on the hook at the ribs 38 (note action arrow A). This downward movement about the hinge 22 serves to compress the spring 40 of the spring loaded piston 36. Upon releasing pressure on the hook 20, the spring 40 pushes upward on the piston 36 in the direction of action arrow B with sufficient force to cause the striker 32 to be released from the resilient striker receiver 34. One may then pivot the hook 20 about the hinge 22 in the direction of action arrow C. At the same time, the post 24 is displaced upward in the direction of action arrow D against the biasing force of the biasing element 26 so that the hook 20, when fully deployed, extends across or overlies the rail 42 adjacent the body 12 that rises above the partition 18. The strap S of the purse P may then be positioned on the hook 20 and that purse may then be held by the apparatus 10 at a convenient to reach location adjacent the center console C.

The weight of the purse P on the hook 20 holds the hook in the fully deployed position against the relatively weak force of the biasing element 26. The guard feature 44 that extends concentrically around at least a portion of the striker receiver 34 protects the striker receiver from inadvertent impact damage when the hook 20 is in the deployed position. In one possible embodiment, the guard feature 44 is an integrally molded part of the partition 18.

One may easily and efficiently return the hook 20 to the home position by first removing the strap S of the purse P. Next, one engages the hook 20 and pivots the hook in the direction of action arrow E about the hinge 22. (see FIG. 3c)

The biasing element 26 tends to return the post 24 to the stowed position, fully retracted into the partition 18 as the operator presses the hook downward in the direction of action arrow F (see FIG. 0.3b) so that the striker 32 is once again fully engaged in the striker receiver 34. In this way, the hook 20 is returned to the home position illustrated in FIGS. 1 and 3a wherein the hook is seated flush within the partition 18 so as to provide an aesthetically pleasing appearance to the apparatus within the center console C of the motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a body including a first cup well, a second cup well and a partition wherein said partition is positioned between said first cup well and said second cup well;
   a hook carried on said body, said hook being (a) displaceable between a home position and a deployed position and (b) an integral part of said partition;
   a hinge connecting said hook to said body, said hinge being carried on a post held in said body and displaceable between a stowed position and a raised position; and
   a push-push latch releasably securing said hook in said home position, wherein said push-push latch includes a striker carried on said hook and a striker receiver carried on said partition, and wherein said striker receiver is a spring loaded piston.

2. The apparatus of claim 1, further including a biasing element biasing said post toward said stowed position.

3. The apparatus of claim 2, further including a rail adjacent said body, said rail rising above said partition.

4. The apparatus of claim 3, wherein said hook extends across said rail when in said deployed position.

5. The apparatus of claim 4, further including a guard feature adjacent said striker receiver to protect said striker receiver.

6. The apparatus of claim 4, wherein said hinge is a locking leaf hinge.

* * * * *